Sept. 6, 1932.  W. F. KRENZKE  1,876,249
FRONT DRIVEN AUTOMOBILE
Filed April 14, 1930  3 Sheets-Sheet 1
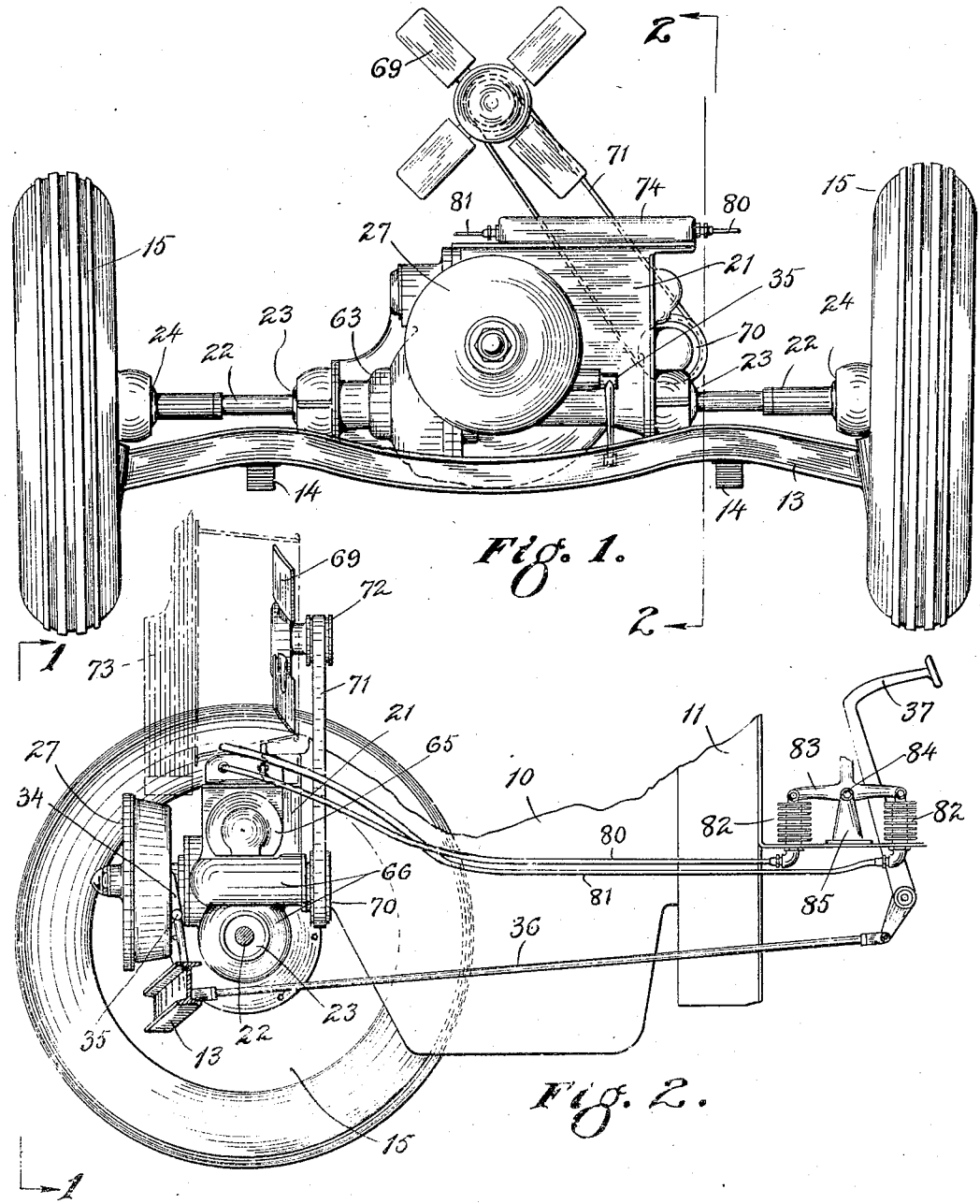

Sept. 6, 1932.  W. F. KRENZKE  1,876,249
FRONT DRIVEN AUTOMOBILE
Filed April 14, 1930   3 Sheets-Sheet 2

INVENTOR
Wm. F. Krenzke,
BY Robert M. Pierson,
ATTORNEY

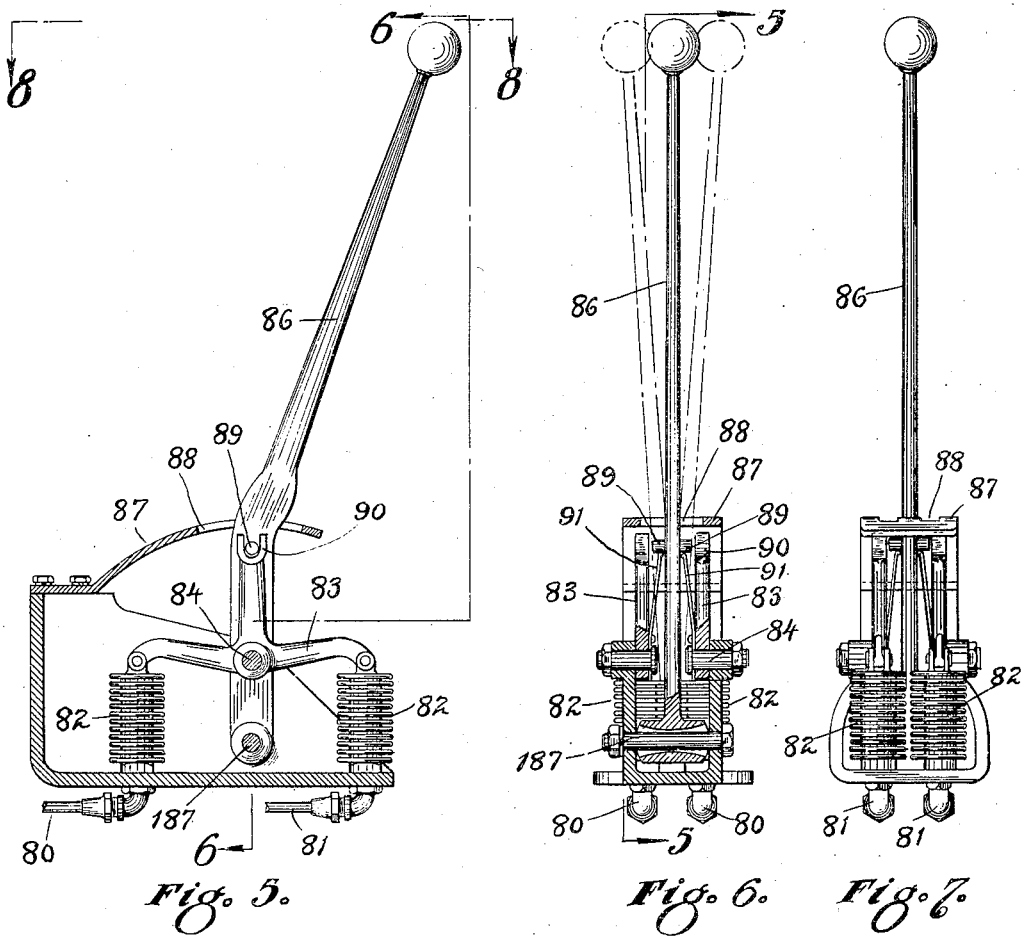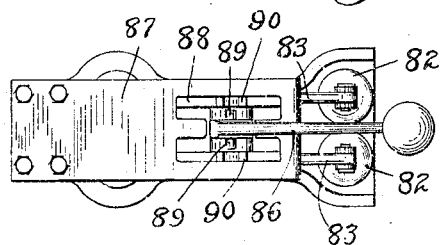

Patented Sept. 6, 1932

1,876,249

UNITED STATES PATENT OFFICE

WILLIAM F. KRENZKE, OF RACINE, WISCONSIN, ASSIGNOR OF ONE-HALF TO THOMAS L. FAWICK, OF AKRON, OHIO

FRONT DRIVEN AUTOMOBILE

Application filed April 14, 1930. Serial No. 444,091.

This invention relates to automobiles driven by internal-combustion engines, in which the engine is placed longitudinally of the vehicle. Its principal object is to provide a power-transmitting and change-gear mechanism of reduced length and having other advantages such as low friction losses, ease of assembly and moderate cost, adapted for use in front-driven vehicles.

Heretofore, in front-drive arrangements, it has usually been considered necessary to have but a single active gearing, of either the worm or bevel type, between the engine and the axle when the transmission is coupled in "high" or direct drive. In such case, when the change-gear unit or transmission is placed rearwardly of the driven axle, the wheel-base must be increased, for a given length of body, and if it is placed in front, there is an excessive forward overhang of said transmission.

The transmission can be placed transversely, parallel with the driven axle, if an additional gear-train or reduction be employed, and my invention relates to this latter species of drive, but prior examples thereof have had many defects including relatively-large unsprung weight, excessive height of axle center from the ground, undue mechanical friction and other disadvantages, all of which are avoided by my present improvements.

Of the accompanying drawings,

Fig. 1 is a front elevation, from the plane 1—1 of Fig. 2, illustrating a portion of a front-drive automobile embodying my invention.

Fig. 2 is a side elevation thereof, partly broken away, from the plane 2—2 of Fig. 1.

Fig. 5 is a vertical section and elevation showing the gear-shift lever and associated parts.

Fig. 6 is a section on the line 6—6 of Fig. 5.

Fig. 7 is a rear elevation of the gear-control mechanism.

Fig. 8 is a plan view thereof from plane 8—8 of Fig. 5.

Figure 3:
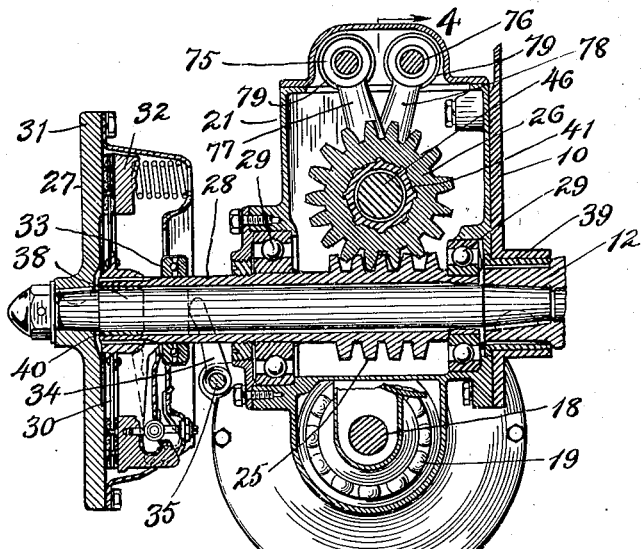
Fig. 3 is a longitudinal, vertical section on the line 3—3 of Fig. 4.
Figure 4:
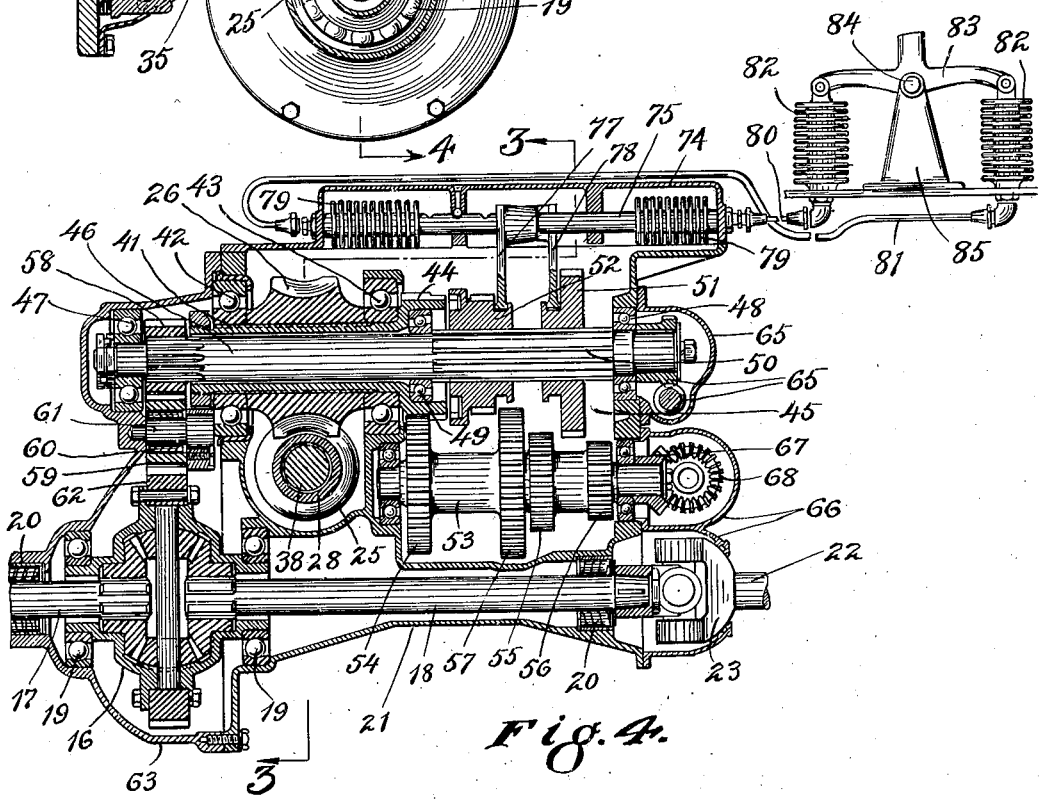
Fig. 4 is a section on the line 4—4 of Fig. 3.

Referring to the drawings, 10 (Fig. 2) is the crank case of an internal-combustion engine, supported in the usual manner on the vehicle frame, which is omitted in the drawings. The fly-wheel is placed at the rear in a fly-wheel casing 11. In Fig. 3 is shown the front end of the engine crank-shaft 12.

13 is the front dead-axle attached to the springs 14 and preferably bowed forwardly to avoid striking the gear casing, said axle having pivoted thereto the usual steering knuckles having hollow stub axles upon which the steerable ground wheels 15 are mounted.

Above the dead-axle 13 is mounted a transverse live-axle structure including a differential gearing 16, a pair of aligned shaft-sections 17, 18 projecting therefrom and mounted in anti-friction bearings 19, 20 in the lower portion of a gear casing 21 which is detachably secured to the front of the engine casing 10, and a pair of outer shaft-sections 22 connected at their inner ends by universal joints 23 with the shaft sections 17 and 18 respectively and at their outer ends by universal joints 24 with the wheels 15.

Mounted within the gear casing 21, above the live-axle structure and on an axis coinciding with that of the engine crank-shaft 12 is a worm 25 meshing with the teeth of a worm-gear 26 located above it, in said casing, on a transverse axis. The rotary motion of the engine shaft 12 is transmitted to the worm 25 through a friction clutch 27 which I prefer to locate forward of said worm, as shown, in order to conserve space in the rear of the driven axle and avoid lengthening the wheel-base, although my invention is not wholly limited to this location.

With the clutch thus located, a tubular worm-shaft 28 is employed, mounted in a pair of ball-bearings 29, 29 adapted to take both radial and thrust loads. To the front end of this worm-shaft is splined the driven clutch-disk 30, mounted between the driving clutch-plate 31 and the axially-movable driving clutch-ring 32. 33 is the usual ball-bearing thrust collar working through the clutch levers upon the ring 32 to release the clutch against the pressure of its springs, and operated by a fork 34 upon a rock-shaft 35, and through suitable intermediate rocker arms and link 36 from a clutch-pedal lever 37.

The driving clutch-plate 31 is keyed to the front end of a prime-mover or driving shaft 38 forming a forward extension of the engine shaft 12, which latter is journaled in a bearing 39 on the engine casing 10, said shafts 12 and 38 being keyed together and also axially held together with a taper fit. Immediately in back of plate 31, the shaft 38 has a bearing in a centralizing bushing 40 in the outer end of the tubular worm-shaft 28, but for the rest of its length within said tubular shaft, in the rear of said bushing, it is spaced from the outer shaft with a slight clearance. Thus the clutch is supported by the combined shaft structure, and the inner shaft is prevented from binding in case of slight springing or misalignment of the parts, while the worm shaft is independently and anti-frictionally supported against thrusts and gear action in whatever direction.

The worm-gear 26 is keyed by means of a series of splines upon a short, tubular shaft 41 rotatably supported in the casing 21 by ball bearings 42, 43. Shaft 41 is formed at its inner end with an enlarged head 44 for connection with a conventional three-speed and reverse, sliding-gear transmission set which is mounted at one side of the worm-gear drive, above the axle section 18, and designated generally as 45. 46 is the main driven spindle or propeller shaft of this unit, passing concentrically through the tubular shaft 41.

Shaft 46 is supported at its two ends by means of ball bearings 47, 48 on the casing walls, and also by an intermediate ball bearing 49 within the head 44 of tubular shaft 41. Between the bearings 48 and 49 it is formed with splines 50 on which slide the shiftable members 51, 52 for changing the gear ratios. Directly beneath shaft 46, between it and the axle shaft-section 18, is the counter-shaft 53 of the sliding-gear set, mounted in ball bearings at its two ends and having a gear 54 in constant mesh with gear teeth on the shaft-head 44, a low-speed gear 55 for meshing with the shiftable member 51 in one position of the latter, a reverse gear 56 for entrainment with said member 51 in its other position, through the usual extra gear (not shown), and a second-speed or intermediate gear 57 for meshing with the shiftable member 52 in one position of the latter. In the other position of member 52, internal positive clutch teeth thereon engage with external clutch teeth formed by extensions of the gear teeth on the shaft-head 44 for effecting the high-speed or direct coupling of the shafts 28 and 38.

The final drive from shaft 46 to the casing of differential gear 16 is preferably through a three-gear spur train comprising a pinion 58 keyed by splines to the shaft 46, an intermediate or idler gear 59 supported by a roller bearing 60 on a fixed journal or stud 61, and a ring gear 62 bolted to the differential casing. However, I do not wholly limit myself to the use of this particular gear train.

The differential gear 16 and the final-drive train 58, 59, 62 are contained at one side of the casing 21 in a hollow cover or end casing member 63 which is detachably secured to the body of casing 21 by a universal joint in a vertical longitudinal plane. At the opposite end of said casing body are detachably secured a housing or casing member 64 covering the end of the shaft 46 and enclosing a speedometer-drive gearing 65, and a second double housing or casing member 66 whose lower compartment encloses one of the universal axle joints 23 and whose upper compartment covers the end of counter-shaft 53 and encloses a pair of bevel gears 67, 68 for driving the engine-cooling fan 69, through a pulley 70 on the shaft of gear 68, a belt 71, and a pulley 72 on the hub of the fan. The fan 69 is suitably supported on the engine and may effect cooling of the latter by drawing air through a radiator 73 indicated in broken lines in Fig. 2, or otherwise.

This invention provides a highly satisfactory front-axle driving mechanism for a motor vehicle having its engine longitudinally mounted in front on the vehicle body frame. By placing the transmission or change-gear unit and propeller shaft transversely, over the driven axle, I avoid the objectionable lengthening of wheel-base or overhang of the transmission which have characterized previous front-driven cars. Although an extra gear train or reduction is employed, its driving member runs at engine speed, the tooth pressures are low, the gearing is practically noiseless when made of the worm type, and the extra friction is very slight when the parts are mounted and arranged substantially as above described. The height of ground-wheel centers need be no greater than usual, since the clutch and all gearing anterior to the differential are located above the live-axle structure, and this position also makes the gearing and shafting accessible and easy to assemble and take apart. No extra unsprung weight is or need be involved, as compared with prior drives of this class which have been used.

For shifting the transmission gears to effect changes in the ratio I have provided an improved system of remote control by means of a gear-shift lever having the ordinary motions and acting through hermetically-sealed, fluid-pressure transmission lines which include actuating and receiving devices of the metal-bellows type.

Casing 21 is provided with a top cover 74 formed with guides for shifting-rods 75, 76 having the usual forks 77, 78 occupying grooves in the shiftable members 51, 52. Each end of each of said rods is connected with the movable end-wall of a corrugated, flexible metal bellows 79 of the type commonly used for thermostat purposes. The opposite end-wall of said bellows is fixed to the cover 74 and connected by a metal tube 80 or 81 with one of a pair of actuating bellows 82, the movable ends of the two latter being pivotally connected with opposite ends of an inverted T-lever 83 pivoted at 84 upon a supporting bracket 85 located conveniently to the driver's seat. All pipe couplings are hermetically sealed by soldering or otherwise after the joints are made. Each unit of the system is filled with a non-freezing liquid, such as oil, and small air spaces are preferably left at the highest points, such as the tops of the two bellows 82, to serve as cushions.

Two separate units, each including a pair of receiving bellows 79, a pair of actuating or sending bellows 82, piping 80, 81 and rock-lever 83 are provided for the two shifting-rods 75, 76, and the levers 83 with their pairs of actuating bellows 82 are mounted alongside of each other at the control station as indicated in Figs. 6 and 7. 86 is a gear-shift lever pivoted at its lower end on a rod or pintle 187 for universal rocking movement, and guided by the usual arcuate gate 87 formed with an H-shaped slot 88. The lever 86 carries a transverse pin whose ends form a pair of portions 89 adapted alternatively to enter between the jaws of either one of a pair of forks 90 formed on the upper ends of the stems of the respective rock-levers 83. Normally, the lever 86 is centralized in neutral position by means of a pair of springs 91 attached to the respective levers 83.

While I might employ other means for controlling the shifting of gears, the foregoing provides a very simple, inexpensive and positive apparatus which is not easily deranged and is superior to purely mechanical devices in this and similar situations.

Various changes may be made in the described embodiment without departing from the scope of my invention as defined in the claims.

I claim:

1. Automobile driving means comprising a longitudinal prime-mover shaft, a transverse live-axle shaft extending under said prime-mover shaft, a transversely-positioned change-gear set, a friction clutch for driving the latter, and gearing located over said live-axle shaft for connecting the prime-mover shaft with the friction clutch.

2. Automobile driving means comprising a longitudinal driving shaft, a transverse live-axle shaft having a portion located underneath said driving shaft, a separately-mounted, transverse propeller shaft offset from and geared to the live-axle shaft, and a transversely-positioned change-gear set in part mounted on said propeller shaft.

3. Automobile driving means comprising a longitudinal driving shaft, a transverse live-axle shaft, a transverse propeller shaft located above said live-axle shaft and connected to drive the latter, and gearing for connecting the driving and propeller shafts, said gearing including a driving member positioned at an intermediate level between the live-axle and propeller shafts, and ratio-changing means in the driving train.

4. Automobile driving means comprising a live-axle shaft and a propeller shaft laterally spaced apart, a tubular shaft surrounding said propeller shaft and having a worm-gear, and a driving worm positioned between said shafts and meshing with said worm-gear.

5. Automobile driving means comprising a transverse live-axle shaft, a transverse propeller shaft laterally offset from and geared to said live-axle shaft, a sliding-gear change-speed set including a gear element slidable on said propeller shaft, and anterior devices in the driving train, including a longitudinal prime-mover shaft extending under said propeller shaft, a friction clutch, and gearing located over the live-axle shaft.

6. Automobile driving means comprising a transverse tubular shaft having a driven gear, a longitudinal shaft having a driving member meshing therewith, a sliding-gear change-speed set including a propeller shaft passing through said tubular shaft and provided with an intermediate bearing in the latter and with independent end bearings, and axle means geared to said propeller shaft.

7. Automobile driving means comprising a tubular shaft having at one end a head formed with a constant-mesh gear, and a sliding-gear set including a counter-shaft driven from said gear and a propeller shaft passing through the tubular shaft and provided with an anti-friction bearing in said head, together with means for driving said tubular shaft, and axle means driven by said propeller shaft.

8. Automobile driving means comprising a transverse live-axle structure including a differential gear and its casing, a parallel, transverse propeller shaft located substantially in the same vertical transverse plane as the differential gear, a connecting gear train including a pinion on the propeller shaft, an intermediate idler gear and a ring gear on the differential casing, and driving means including a friction clutch, and speed-changing means anterior to said connecting gear train.

9. Automobile driving means comprising a gear casing, worm gearing including a worm shaft, bearings on said casing for supporting said shaft against radial and end thrusts, a friction clutch supported by said shaft at one end thereof, and a prime-mover shaft passing through said tubular shaft and having a bearing thereon at the clutch end only of the latter.

10. An automobile driving and change-gear unit comprising a longitudinal prime-mover shaft, a primary gearing driven thereby, a transverse live-axle shaft, a differential gear and its casing in line with the latter and offset from the prime-mover shaft and primary gearing transversely of said prime-mover shaft, a propeller shaft, an anterior change-gear set, a final-drive gearing connecting said propeller shaft with the differential casing, a main gear casing enclosing said transverse shafts, primary gearing and change-gear set, and a secondary casing structure detachably mounted by a joint in a vertical longitudinal plane on the side of said main casing and enclosing said differential gear and final-drive gearing.

11. An automobile front-drive mechanism comprising a longitudinal, tubular worm-shaft and worm, a prime-mover shaft in said worm shaft, a friction clutch carried at the front end of said worm shaft, for connecting it with the prime-mover shaft, a worm-gear having a transverse tubular shaft, a propeller shaft in the latter, a sliding-gear change-speed set having a shiftable member on said propeller shaft, a gear casing enclosing said shafting and gearing, and a transverse, front live-axle structure including a differential gear having its casing geared to said propeller shaft.

12. In an automobile, the combination, of an internal-combustion engine having a cooling fan, a driven axle, a friction clutch for connecting said engine and driven axle, means driven by said clutch for operating said cooling fan, and a casing structure supporting the driven axle, clutch and fan-operating means.

13. In a front-drive automobile, the combination of an internal-combustion engine having a cooling fan, a front live axle, a friction clutch for connecting said engine therewith, a change-gear mechanism between said clutch and axle including a member which is constantly rotated when the clutch is engaged, a driving connection between said member and the cooling fan, and a casing structure supporting said live axle, clutch, change-gear mechanism and fan-driving connection.

14. In a front-drive automobile, the combination of a front ground wheel, an internal-combustion engine, driving connections including a change-gear mechanism between said engine and wheel, a gear-shifting hand-lever, and a hermetically sealed liquid system including expansible metal bellows devices for transmitting the movements of said lever to the shiftable elements of the change-gear mechanism.

15. In a front-drive automobile, the combination of a front ground wheel, an internal-combustion engine, driving connections including a change-gear mechanism between said engine and wheel, a plurality of pairs of expansible metal receiving bellows devices associated with said change-gear mechanism for reciprocating the parts thereof to effect the gear changes, a gear-shifting hand-lever, and a plurality of pairs of expansible metal sending bellows devices adapted to be selectively associated with said hand-lever and having their members respectively piped to the receiving members.

In witness whereof I have hereunto set my hand this 9th day of April 1930.

WILLIAM F. KRENZKE.